(12) United States Patent
Greer et al.

(10) Patent No.: US 8,604,369 B2
(45) Date of Patent: Dec. 10, 2013

(54) CIRCUIT BREAKER REMOTE RACKING DEVICE

(75) Inventors: Chester Levi Greer, Baton Rouge, LA (US); Joshua Allen Norton, Baton Rouge, LA (US)

(73) Assignee: inoLECT, LLC, Baton Rouge, LA (US)

( * ) Notice: Subject to any disclaimer, the term of this patent is extended or adjusted under 35 U.S.C. 154(b) by 151 days.

(21) Appl. No.: 13/210,368

(22) Filed: Aug. 15, 2011

(65) Prior Publication Data

US 2012/0055766 A1    Mar. 8, 2012

Related U.S. Application Data

(60) Provisional application No. 61/379,846, filed on Sep. 3, 2010.

(51) Int. Cl.
*H01H 9/20* (2006.01)

(52) U.S. Cl.
USPC ........................................................ 200/50.24

(58) Field of Classification Search
USPC ...................................... 202/50.24; 200/50.24
See application file for complete search history.

(56) References Cited

U.S. PATENT DOCUMENTS

| | | |
|---|---|---|
| 5,453,587 A | 9/1995 | Hurley |
| 5,477,017 A | 12/1995 | Swindler |
| 6,777,627 B1 | 8/2004 | Stevenson |
| 6,897,388 B2 | 5/2005 | Greer |
| 6,951,990 B1 | 10/2005 | Miller |
| 7,019,230 B1 | 3/2006 | Vaill |
| 7,825,344 B2 | 11/2010 | Stevenson |

*Primary Examiner* — Vanessa Girardi
(74) *Attorney, Agent, or Firm* — Christopher S. Nichols (57) ABSTRACT

A device is provided for remotely racking circuit breakers and contactors that are housed within a housing structure, such as a circuit breaker cell or switchgear cabinet.

19 Claims, 7 Drawing Sheets

CIRCUIT BREAKER REMOTE RACKING DEVICE

CROSS-REFERENCE TO RELATED APPLICATION

This application claims benefit to provisional application 61/379,846 filed on Sep. 3, 2010.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The present disclosure relates to subject matter for remotely racking a circuit breaker, particularly subject matter including a force amplifying or levering mechanism for locking the breaker in each of its plurality of positions automatically without the need for operator intervention to determine how far the circuit breaker must be displaced to place it in the desired position.

2. Description of Related Art

In utility and industrial applications, circuit breakers and contractors are utilized to establish electrical circuits. From time to time, maintenance requirements (e.g. repair, replacement, or load control) necessitate racking operations to disconnect ("rack out") and connect ("rack in") these breakers or contactors. During these operations, electrical circuits may short-circuit and produce a dangerous condition known as an arc flash.

Arc-flash occurs when an electric current passes through air when insulation or isolation between electrified conductors is insufficient to withstand the applied voltage. During an arc flash, temperatures rapidly escalate causing conductors to melt, vaporize, and expand to several thousand times their normal volume, which generates a pressure wave carrying molten metal capable of hitting surfaces with forces of several hundred pounds per square inch. As a result, maintenance personnel must possess a means and method for safely performing racking operations to prevent injury or death from an arc-flash.

In the past, maintenance personnel have utilized personal protective equipment (PPE) to reduce exposure to potential arc flash hazards. However, PPE alone will not eliminate the risk of injury or death because personnel are still in close proximity to the circuit breaker during racking operations. In order to mitigate the likelihood of injury or death further, personnel must perform racking operations a safe distance from the circuit breaker, i.e. remotely. U.S. Pat. No. 6,897,388 attempts to address these issues, however, this reference and other references in the related art have not adequately solved the need for a simple and effective apparatus for remotely racking circuit breakers. Thus, a need exists for more versatile apparatus and method for remotely racking circuit breakers.

BRIEF SUMMARY OF THE INVENTION

The object of this invention is to provide a more versatile apparatus and method for remotely racking circuit breakers and contactors. For purposes of illustration, the invention will be described as applied to low voltage circuit breakers. However, the invention may also be applied to other types of electrical apparatus (e.g., without limitation, circuit switching devices and other circuit interrupters such as contactors, motor starters, motor controllers and other load controllers) housed within a housing structure, such as a circuit breaker cell or switchgear cabinet.

A remote racking unit used in accordance with this invention comprises a stationary vertical support fixed to a racking unit base. The stationary vertical support and racking unit base remain stationary and are in a fixed position at all times.

The racking unit base is equipped with at least one front wheel and at least one rear wheel. The front wheel is preferably a caster type wheel that enables turning of the remote racking unit. The rear wheel is preferably a flat free style wheel that is larger than the front wheel and allows an operator to easily move the remote racking unit. Both the front and rear wheel are coupled to the racking unit base.

The remote racking unit also has an intermediate structural support, which is engaged in a low friction substantially vertical sliding relationship with the stationary vertical support. The intermediate structural support moves vertically with respect to the stationary vertical support, but it is not directly connected to the stationary vertical support. The stationary structural support provides a guiding means for guiding and moving the intermediate structural support along the vertical axis.

An actuator is coupled to the bottom of the stationary vertical support and to the top of the intermediate structural support. The actuator is also attached to the remote racking unit base. An actuator is utilized to move the intermediate structural support along the vertical axis. As the actuator extends, the intermediate structural support moves upwardly as well. As the actuator retracts, the intermediate structural support moves downwardly.

The remote racking unit is also provided with a motor mount structure having a sliding motor structure. The motor mount structure provides a means to support a motor and also allows the motor to slide forward and backward along the horizontal axis. Not shown is a link that is connected to the top portion of the stationary vertical support and passes over the top of the intermediate structural support and then extends downward and attaches to the sliding motor structure. As the intermediate structural support extends upward, the link is pulled over the top of the intermediate structural support resulting in the vertical movement of the sliding motor structure at a 2:1 ratio, i.e. for every inch that the intermediate structural support moves vertically, the sliding motor structure moves vertically by a multiple of 2.

The sliding between supports is accomplished by placing wear resistant slippery nylon (not shown) in the area between the supports to eliminate contact friction. The nylon is located at the top of the stationary structural support, the bottom of the intermediate structural support, and along the entire length of the sliding motor structure. The stationary structural support, intermediate structural support, sliding motor structure, and motor mount structure are all made of extruded aluminum that is anodized for premier performance, quality, and corrosion resistance with a limited coefficient of friction.

The motor is supported by the motor mount structure. The motor is preferably a three phase racking gear motor. The motor is also provided with a shaft and adapter structure. The adapter structure is fabricated and arranged to be coupled with a horizontally configured circuit breaker. Alternatively, the adapter structure may be coupled to an adapter.

The remote racking unit has a control box that houses the electronic controls of the unit. The electronic controls comprise a variable frequency drive and a controller, such as a programmable logic controller (PLC); however, the electronic controls are not limited to these items. The control box is attached to the racking unit base and to the vertical member. The variable frequency drive and programmable logic controller in the control box control the motor. The motor may slide back and forth with the breaker along the motor mount structure. A motor housing houses the motor. The motor housing provides shielding for motor. The motor housing is maintained in the forward position by the constant force springs, which allows the motor to be in constant engagement with the breaker or adapter it is operating.

In addition, the remote racking unit may also have a brake assembly that allows an operator to maintain the remote racking unit in position during racking operations. The brake assembly is attached to the racking unit base and interacts with the rear wheel. An encoder is mounted to the motor. The encoder mounted to the motor and the motor position sensor mounted on the horizontal motor carriage track both circuit breaker and racking unit movement and position.

The remote racking unit is controlled from a control station (not shown), preferably a touch screen device. In one embodiment of the invention, the control station is connected to the device control box by a 75 Ft communications/control cable. In another embodiment of the invention, the control station wirelessly communicates with the device control box. The remote racking unit utilizes standard 120 Volt A.C. power, and does not require any interconnection with circuit breaker or switchgear wiring or controls.

DETAILED DESCRIPTION OF THE INVENTION

For purposes of illustration, the invention will be described as applied to low voltage circuit breakers. However, the invention may also be applied to other types of electrical apparatus (e.g., without limitation, circuit switching devices and other circuit interrupters such as contactors, motor starters, motor controllers and other load controllers) housed within a housing structure, such as a circuit breaker cell or switchgear cabinet.

Directional phrases used herein relate to the orientation of the elements shown in the drawings and are not limiting upon the claims unless expressly recited therein. For example, left, right, top, bottom, clockwise, counterclockwise and derivatives thereof.

As employed herein, the term "fastener" refers to any suitable connecting, coupling, or tightening mechanism expressly including, but not limited to, screws, bolts, pins, and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "racking" refers to any suitable manipulation of an electrical apparatus, such as a circuit breaker, with respect to a housing structure (e.g., without limitation, switchgear cabinet) and expressly includes, without limitation, insertion or removal of the circuit breaker from the switchgear cabinet.

As employed herein, the term "link" refers to any known or suitable mechanism (e.g., without limitation, a cable; a wire; a chain; a number of interconnected links; a rigid member such as a socket extension) for interconnecting one component to another in order to provide mechanical communication there between.

Figure 1:
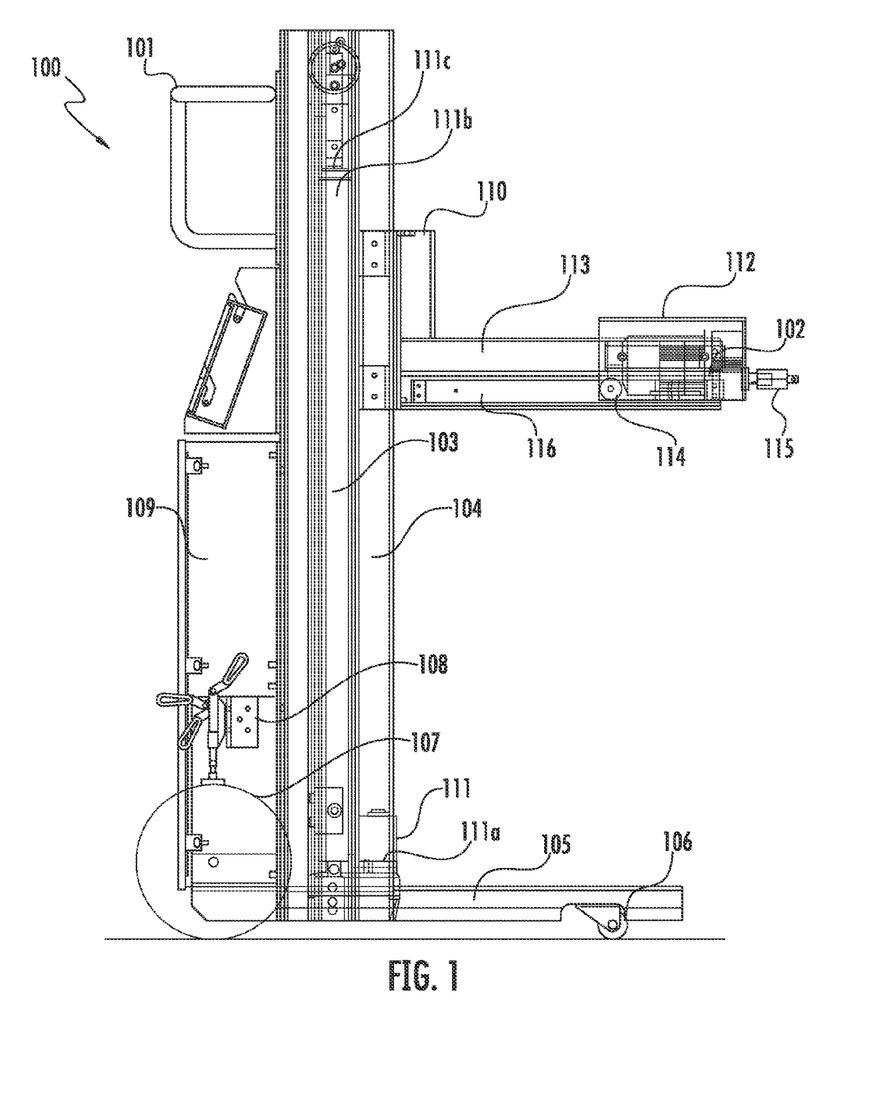
FIG. 1 illustrates a cutaway side view of a remote racking apparatus in accordance with this invention.
Figure 2:
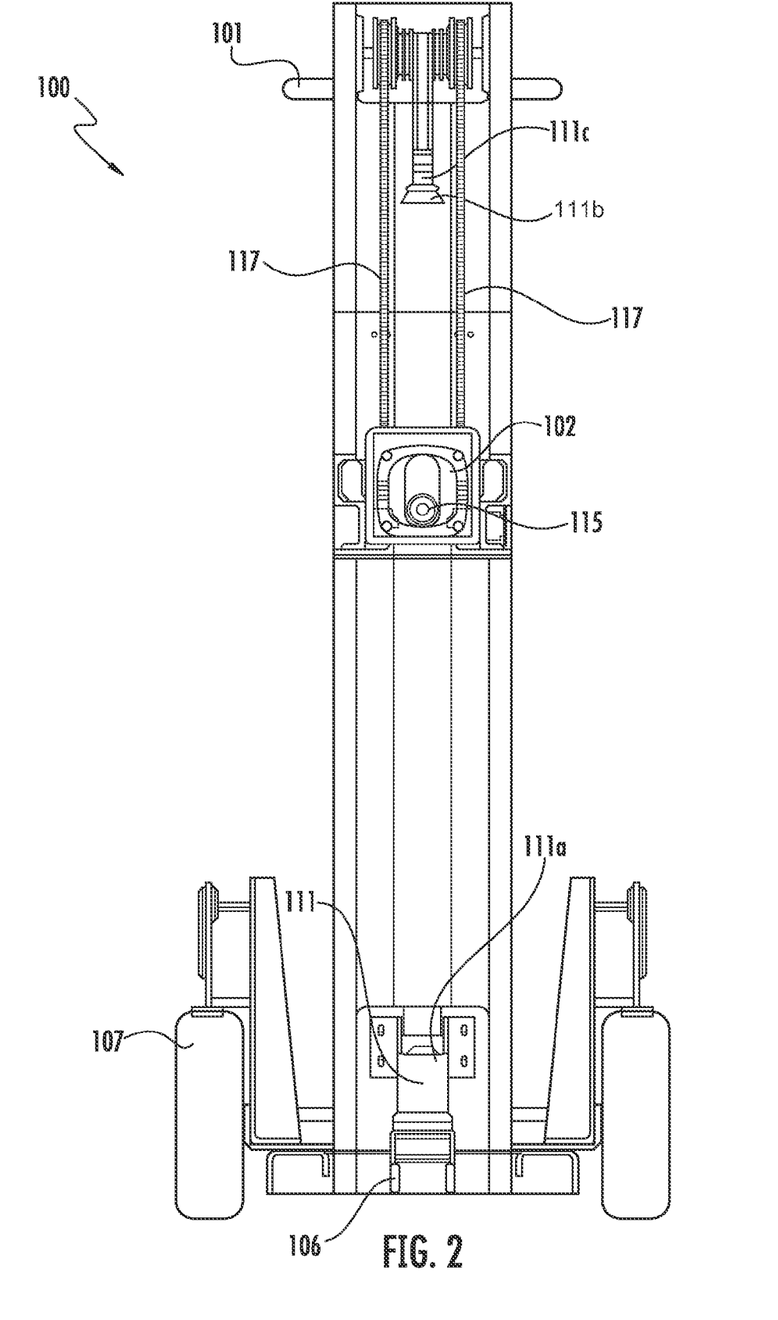
FIG. 2 illustrates a front view of the remote racking apparatus shown in FIG. 1.
Figure 3:
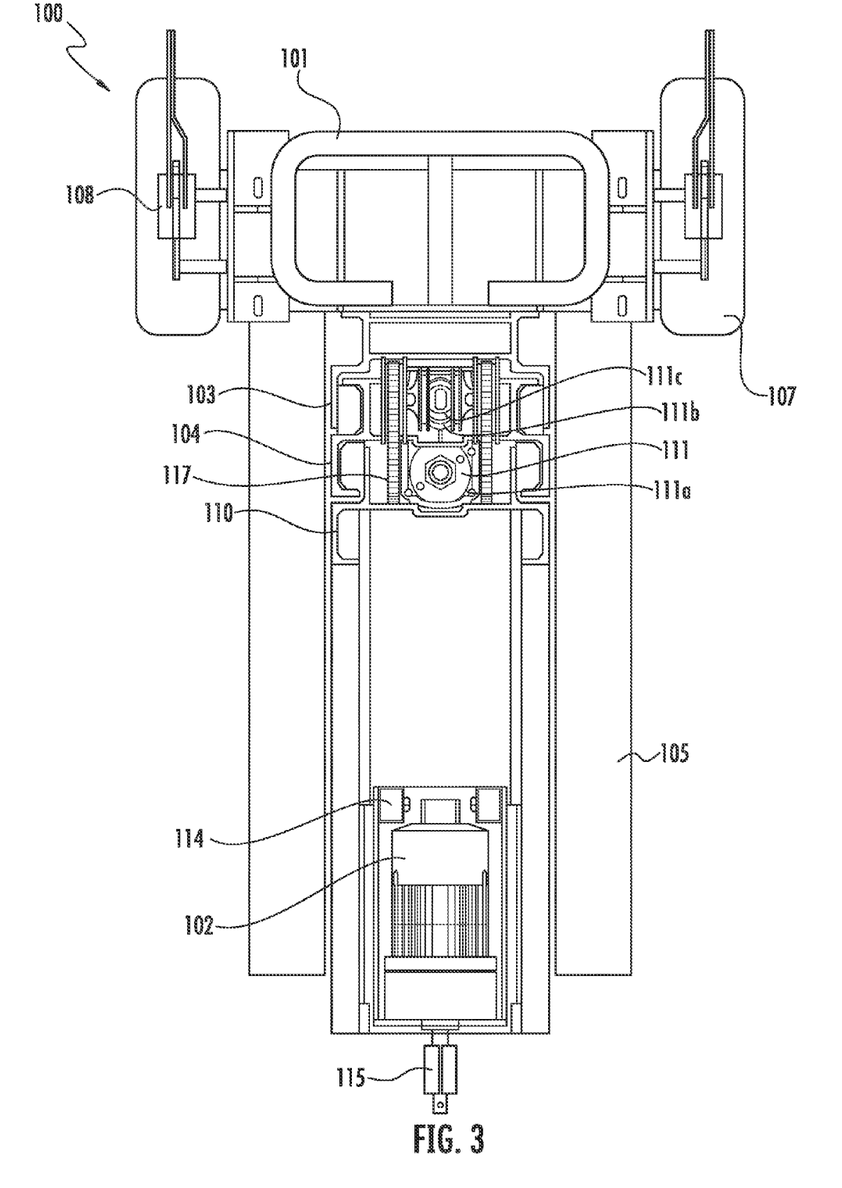
FIG. 3 illustrates a top view of the remote racking apparatus shown in FIG. 1.
Figure 4:
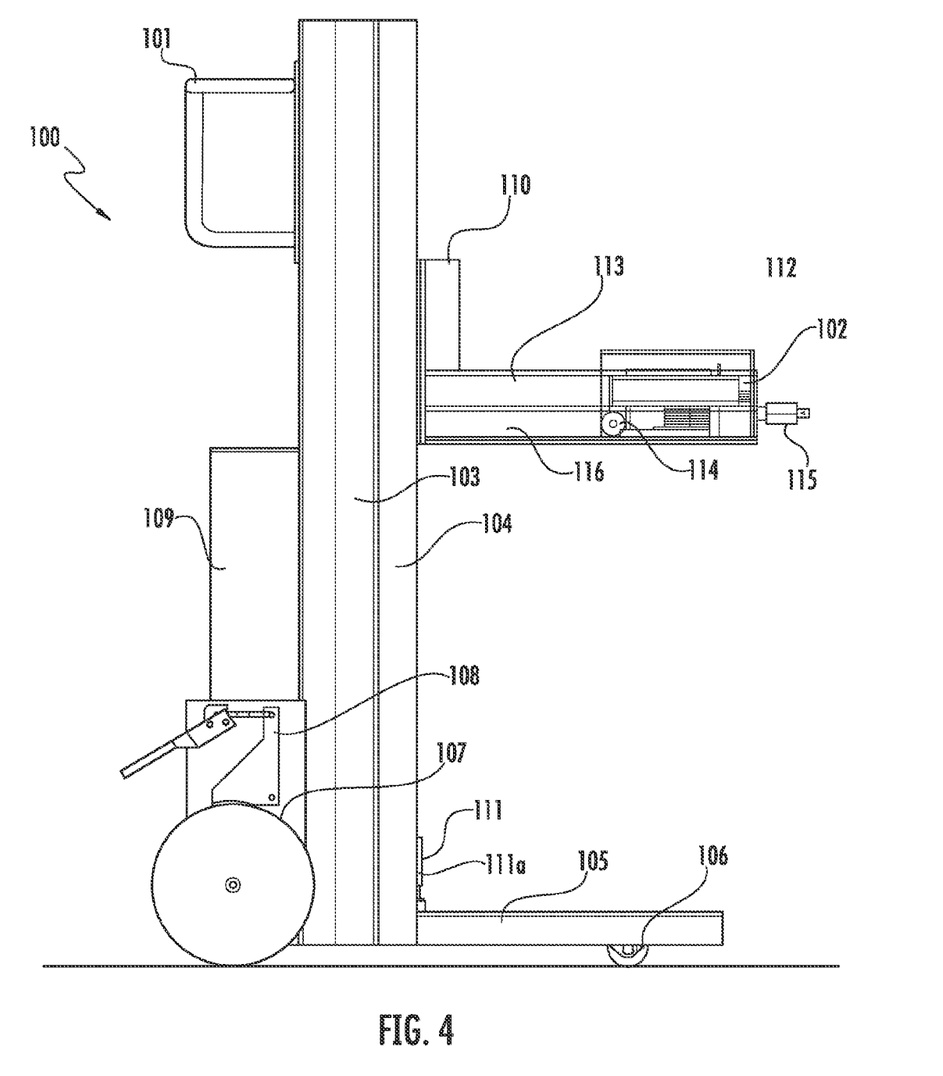
FIG. 4 illustrates is a side view of the remote racking apparatus shown in FIG. 1.
Figure 5:
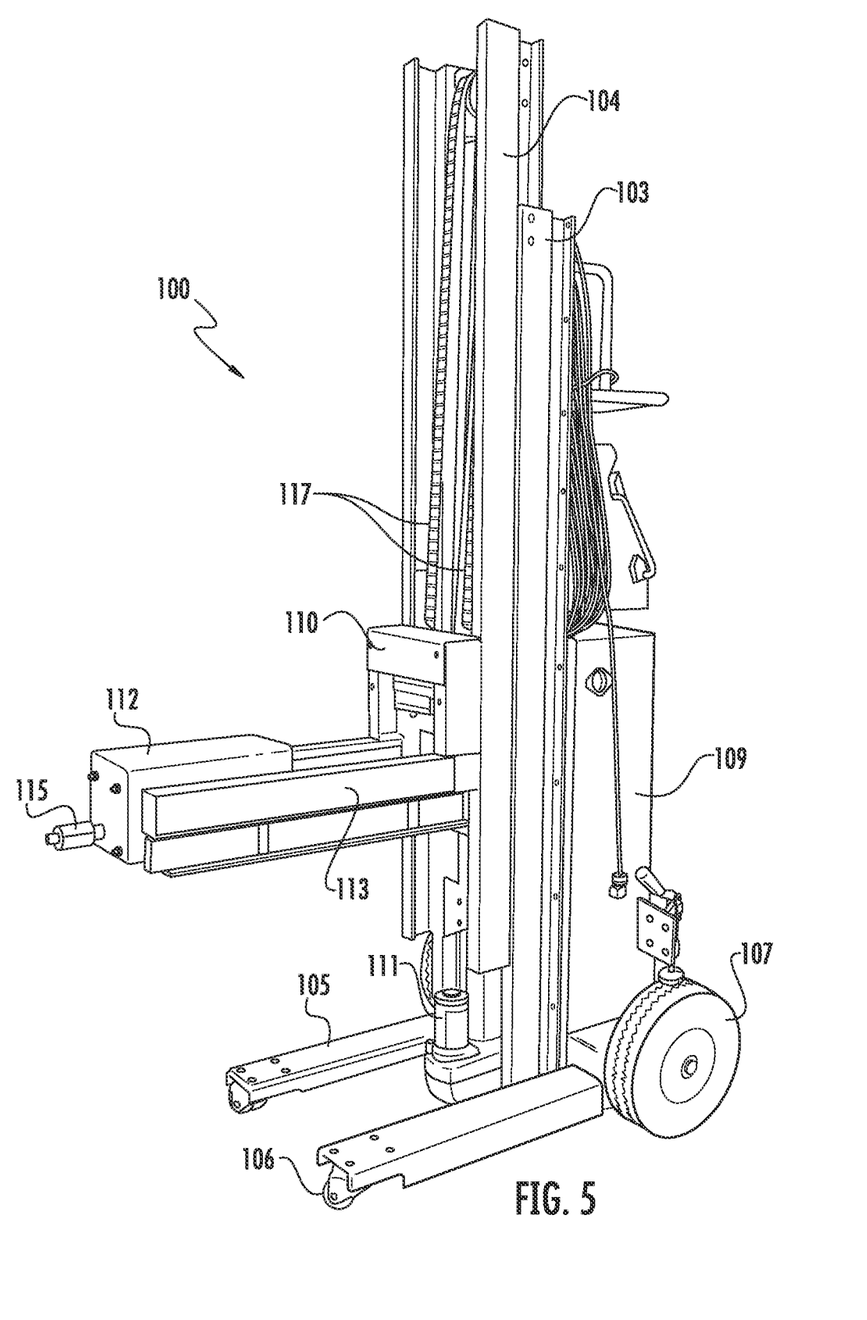
FIG. 5 illustrates an embodiment of a remote racking apparatus in accordance with this invention.
Figure 6:
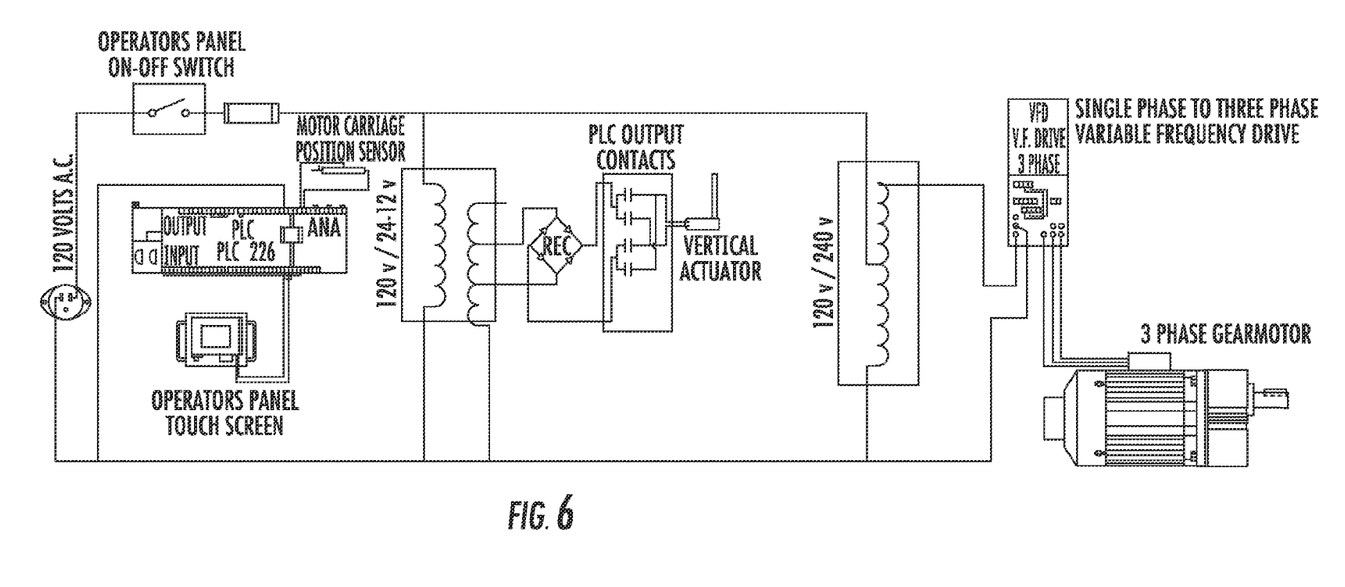
FIG. 6 illustrates an embodiment of a power schematic for a remote racking apparatus in accordance with this invention.
Figure 7:
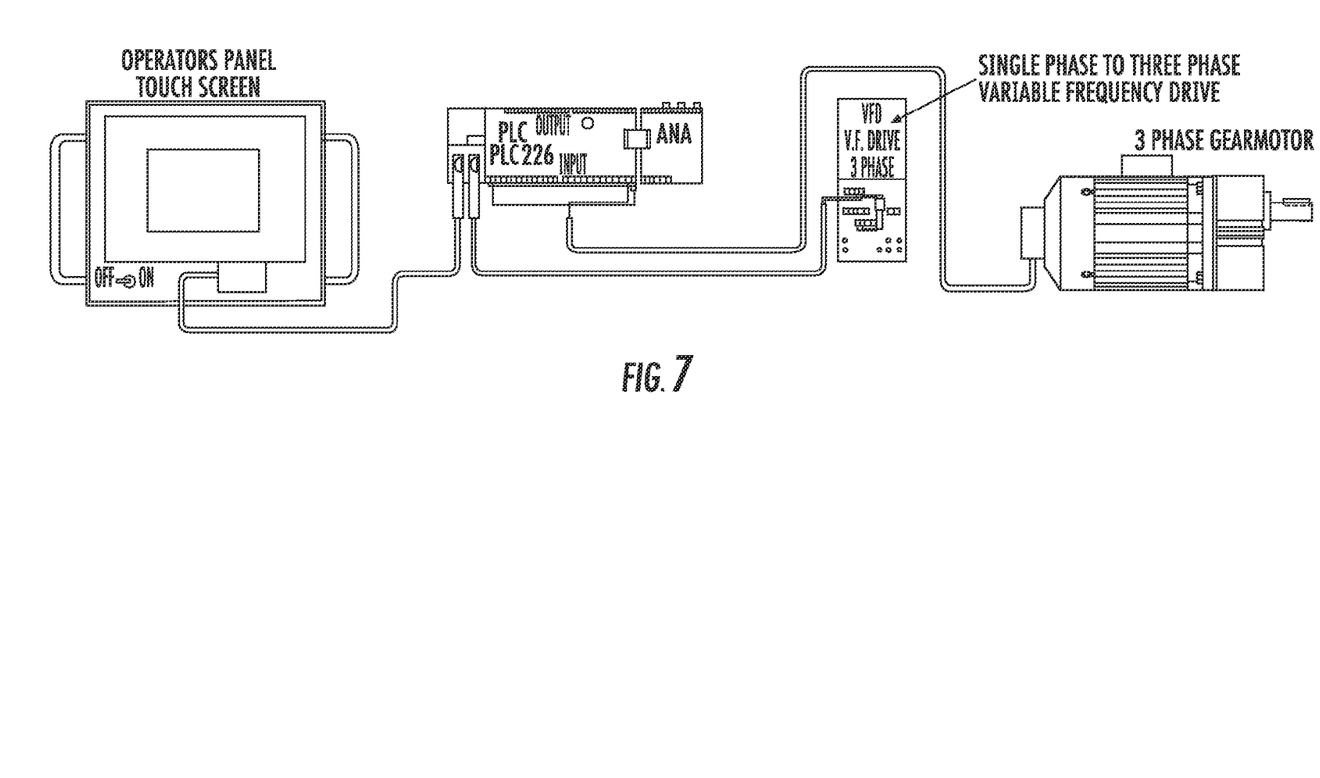
FIG. 7 illustrates an embodiment of a communications schematic for a remote racking apparatus in accordance with this invention.

A remote racking unit used in accordance with this invention is shown generally in FIG. 1 at 100. The remote racking unit 100 comprises a stationary vertical support 103 fixed to a racking unit base 105. The stationary vertical support 103 and racking unit base 105 remain stationary and are in a fixed position at all times.

The racking unit base 105 is equipped with at least one front wheel 106 and at least one rear wheel 107. The front wheel 106 is preferably a caster type wheel that enables turning of the remote racking unit 100. The rear wheel 107 is preferably a flat free style wheel that is larger than the front wheel 106 and allows an operator to easily move the remote racking unit 100. Both the front 106 and rear wheel 107 are coupled to the racking unit base 105.

The remote racking unit also has an intermediate structural support 104, which is engaged in a low friction substantially vertical sliding relationship with the stationary vertical support 103. The intermediate structural support 104 moves vertically with respect to the stationary vertical support 103, but it is not directly connected to the stationary vertical support 103. The stationary structural support 103 provides a guiding means for guiding and moving the intermediate structural support 104 along the vertical axis.

An actuator 111 is coupled to the bottom of the stationary vertical support 103 and to the top of the intermediate structural support 104. The actuator 111 is also attached to the remote racking unit base 105. The actuator 111 is utilized to move the intermediate structural support 104 along the vertical axis. As the actuator 111 extends, the intermediate structural support 104 moves upwardly as well. As the actuator 111 retracts, the intermediate structural support 104 moves downwardly.

The remote racking unit is also provided with a motor mount structure 113 having a sliding motor structure 110. The motor mount structure 113 provides a means to support a motor 102 and also allows the motor 102 to slide forward and backward along the horizontal axis. A link 117 is connected to the top portion of the stationary vertical support 103 and passes over the top of the intermediate structural support 104 and then extends downward and attaches to the sliding motor structure 110. As the intermediate structural support 104 extends upward, the link 117 is pulled over the top of the intermediate structural support 104 resulting in the vertical movement of the sliding motor structure 110 at a 2:1 ratio, i.e. for every inch that the intermediate structural support 104 moves vertically, the sliding motor structure 110 moves vertically by a multiple of 2.

The sliding between supports is accomplished by placing wear resistant slippery nylon (not shown) in the area between the supports to eliminate contact friction. The nylon is located at the top of the stationary structural support 103, the bottom of the intermediate structural support 104, and along the entire length of the sliding motor structure 110. The stationary structural support 103, intermediate structural support 104, sliding motor structure 110, and motor mount structure 113 are all made of extruded aluminum that is anodized for premier performance, quality, and corrosion resistance with a limited coefficient of friction.

The motor 102 is supported by the motor mount structure 113. The motor 102 is preferably a three phase racking gear motor. The motor is also provided with a shaft and adapter structure 115. The adapter structure is fabricated and arranged to be coupled with a horizontally configured circuit breaker. Alternatively, the adapter structure 115 may be coupled to an adapter.

The remote racking unit has a control box 109 that houses the electronic controls of the unit. The electronic controls comprise a variable frequency drive and a controller, such as a programmable logic controller (PLC); however, the electronic controls are not limited to these items. The control box 109 is attached to the racking unit base 105 and to the vertical member 103. The variable frequency drive and programmable logic controller in the control box 109 control the motor 102. The motor 102 may slide back and forth with the breaker along the motor mount structure 113. A motor housing 112 houses the motor 102. The motor housing 112 provides shielding for motor 102. The motor housing 112 is maintained in the forward position by constant force springs 114, which allows- the motor 102 to be in constant engagement with the breaker or adapter it is operating.

In addition, the remote racking unit 100 may also have a brake assembly 108 that allows an operator to maintain the remote racking unit 100 in position during racking operations. The brake assembly 108 is attached to the racking unit base 105 and interacts with the rear wheel 107. An encoder is mounted to the motor 102. The encoder mounted to the motor 102 and a motor position sensor 116 mounted on the horizontal motor carriage 113 track both circuit breaker and racking unit movement and position.

The remote racking unit 100 is controlled from a control station (not shown), preferably a touch screen device. In one embodiment of the invention, the control station is connected to the device control box 109 by a 75 Ft communications/control cable. In another embodiment of the invention, the control station wirelessly communicates with the device control box 109. The remote racking unit 100 utilizes standard 120 Volt A.C. power, and does not require any interconnection with circuit breaker or switchgear wiring or controls.

Any reference to patents, documents and other writings contained herein shall not be construed as an admission as to their status with respect to being or not being prior art. It is understood that the array of features and embodiments taught herein may be combined and rearranged in a large number of additional combinations not directly disclosed, as will be apparent to one having skill in the art.

There are, of course, other alternate embodiments, which are obvious from the foregoing descriptions of the invention, which are intended to be included within the scope of the invention, as defined by the following claims.

What is claimed is:

1. A device for remotely connecting and disconnecting a circuit breaker or contactor from a cell housing, the device comprising:
    a. a base;
    b. at least two wheels attached to the base;
    c. a vertical support attached to the base;
    d. an intermediate structural support engaged in a low friction substantially vertical sliding relationship with the vertical support;
    e. a motor arranged to engage the circuit breaker or contactor;
    f. a motor mount structure with a means for supporting the motor and a means for moving the motor forward and backward along the horizontal axis with respect to the vertical support, wherein the motor mount structure is engaged in a low friction substantially vertical sliding relationship with the intermediate structural support;
    g. an actuator attached to the base, wherein the actuator is capable of moving the intermediate structural support relative to the base;
    h. a controller capable of directing the motion of the actuator and the motor; and
    i. a control station capable of directing the actions of the controller.

2. The device of claim 1, wherein said actuator is coupled to the bottom of the vertical support and to the top of the intermediate structural support.

3. The device of claim 1, wherein the actuator is capable of moving the intermediate structural support substantially along a vertical axis relative to the base.

4. The device of claim 3, wherein the motor is a three phase racking motor.

5. The device of claim 3, further comprising a link connected to the top portion of the vertical support that passes over the top of the intermediate structural support, extends downward, and attaches to a sliding motor structure that is attached to the motor mount structure.

6. The device of claim 3 wherein the stationary vertical support is configured to guide the intermediate structural support.

7. The device of claim 6 further comprising an adapter structure attached to the motor, wherein the adapter structure is configured to couple to the circuit breaker or contactor.

8. The device of claim 7 further comprising a motor housing configured to shield the motor, and wherein the actuator comprises a cylinder and shaft.

9. The device of claim 8 wherein the motor housing is maintained in position by constant force springs configured to permit the motor to be in constant engagement with the breaker or contactor.

10. A device for remotely racking a circuit breaker or contactor, the device comprising:
    a. a base configured to enable movement of the device;
    b. a vertical support attached to the base;
    c. an intermediate structural support engaged in a substantially vertical sliding relationship with the vertical support;
    d. a motor configured to engage the circuit breaker or contactor, wherein the motor is supported by a motor mount structure and the motor is configured to move substantially horizontally with respect to the motor mount structure.

e. an actuator attached to the base, wherein the actuator is configured to move the intermediate structural support relative to the base;

f. a controller configured to direct the motion of the actuator and the motor; and g. a control station configured to direct the actions of the controller.

11. The device of claim 10 wherein:

a. the vertical support has a length and a width, wherein the length is orthogonal to the base and the width is parallel to the base; and b. a portion of the intermediate structural support extends beyond the width of the vertical support.

12. The device of claim 10 wherein the motor mount structure is engaged in a substantially vertical sliding relationship with the intermediate structural support.

13. The device of claim 12 further comprising a link pulled over the intermediate structural support that enables vertical movement of the sliding motor mount structure.

14. The device of claim 13 further comprising an adapter structure attached to the motor, wherein the adapter structure is configured to be coupled to the circuit breaker or contactor.

15. The device of claim 14 further comprising a motor housing configured to shield the motor, and wherein the actuator comprises a cylinder and shaft.

16. The device of claim 10 wherein the motor housing is configured to maintain the motor in constant engagement with the breaker or contactor the device is operating.

17. The device of claim 16 wherein the device is configured to track the movement and position of the motor, and breaker or contactor.

18. The device of claim 17 wherein:

a. the movement and position of the breaker or contactor is tracked by an encoder mounted to the motor and a motor position sensor mounted on the motor mount structure; and b. constant force springs maintain the motor's engagement with the breaker or contactor.

19. A device for remotely racking a circuit breaker or contactor, the device comprising:

a. a base configured to enable movement of the device;

b. a stationary vertical support attached to the base;

c. an intermediate structural support engaged in a substantially vertical sliding relationship with the vertical support;

d. a motor configured to engage the circuit breaker or contactor, wherein:

i. the motor is supported by a motor mount structure, wherein the motor mount structure is engaged in a substantially vertical sliding relationship with the intermediate structural support; and ii. the motor is configured to move substantially horizontally with respect to the motor mount structure; and e. a link attached to the vertical support and the motor mount structure, wherein the link passes over the top of the intermediate structural support;

f. an actuator attached to the intermediate structural support, wherein the actuator is configured to move the intermediate structural support relative to the base.

g. a controller configured to direct the motion of the actuator and the motor; and h. a control station configured to direct the actions of the controller.

* * * * *